United States Patent [19]

Morimoto

[11] 4,395,101
[45] Jul. 26, 1983

[54] APPARATUS FOR PRESETTING PHOTOGRAPHING DISTANCE FOR CAMERA

[75] Inventor: Ichiro Morimoto, Hachioji, Japan

[73] Assignee: Olympus Optical Company Ltd., Tokyo, Japan

[21] Appl. No.: 308,476

[22] Filed: Oct. 5, 1981

[30] Foreign Application Priority Data

Nov. 14, 1980 [JP] Japan ............................ 55-162958[U]

[51] Int. Cl.³ .................. G03B 3/02; G03B 15/05
[52] U.S. Cl. .................................. 354/128; 354/139; 354/145; 354/149; 354/195
[58] Field of Search ............... 354/127, 128, 139, 145, 354/149, 187, 195, 198

[56] References Cited

U.S. PATENT DOCUMENTS 3,798,670 3/1974 Tanaka ............................... 354/195
4,293,204 10/1981 Wagner et al. .................... 354/127

FOREIGN PATENT DOCUMENTS 52-136619 11/1977 Japan .
52-136620 11/1977 Japan .

*Primary Examiner*—Alan Mathews
*Attorney, Agent, or Firm*—Weinstein & Sutton

[57] ABSTRACT

An apparatus for presetting the photographing distance for a camera is responsive to a movement of flash photography operating means to operate switch operating means which is disposed within an electronic flash to turn a power switch of the electronic flash on. In addition, means for adjusting photographing distance is also operated to bring a taking lens to a flash photography position which is located on the nearer side than a normally focussed position, in an automatic manner.

7 Claims, 2 Drawing Figures

APPARATUS FOR PRESETTING PHOTOGRAPHING DISTANCE FOR CAMERA

BACKGROUND OF THE INVENTION

The invention relates to an apparatus for presetting photographing distance for a camera, and more particularly, to such apparatus in which a taking lens is adjusted automatically to a position corresponding to a flash photography distance which is on the side of a smaller distance than a normally focussed position, in interlocked relationship with an operation which enables a flash photography.

As is well recognized, there is available a lens shutter camera internally housing an electronic flash in which a member which presets a distance for a taking lens can be operated independently from turning on/off of a power switch contained in the electronic flash, so that any distance between infinity to the minimum distance can be chosen for the taking lens during a flash photography.

A camera is also known including a lens protective cover movable between a first position where it covers a taking lens and a second position where it allows the taking lens to be exposed and which is associated with means for establishing a normally focussed position by automatically moving the taking lens to a normally focussed position or universal focus position in response to the movement of the lens protective cover. With a camera of the type described, the taking lens is always situated at the normally focussed position whenever the protective cover is brought to an open position to take a picture. This reduces the likelihood that defocussed photographs result from a failure of distance adjustment, and hence such a camera is preferred for use by beginners. It will be appreciated that the normally focussed position of the taking lens represents a distance adjustment for the taking lens which permits every object being photographed to be taken with a degree of focussing if the object is located at any distance. In particular, the normally focussed position permits an optimum focus condition to be achieved for objects which are located at a medium distance. When the taking lens assumes the normally focussed position, the taking lens will be to a degree out of focus for those objects which are located at smaller distances than the distance corresponding to the normally focussed position. If a flash photography is made when the normally focussed position is established, the fact that a usual electronic flash of a small size has light projection over a distance on the order of 3 to 4 meters results in a flash photography which will achieve a properly focussed condition for those objects located at greater distances, but which will achieve less than satisfactory focussing for objects located at smaller distances. As a consequence, comparing the usual photography and the flash photography utilizing the normally focussed position, it will be seen that the out-of-focus condition will be improved if the taking lens is adjusted to a smaller distance than the distance corresponding to the normal focussed condition, during the flash photography.

What is mentioned above is applicable not only to a lens shutter camera internally housing an electronic flash, but is also applicable to lens shutter cameras on which a devoted electronic flash of a small size is detachably mounted in use.

SUMMARY OF THE INVENTION

It is an object of the invention to provide an apparatus for presetting the photographing distance for a camera including a lens protective cover which may be caused to establish a normally focussed position for a taking lens automatically, and wherein as an operating member disposed on the camera for turning on a power supply associated with an electronic flash is operated, a taking lens is automatically adjusted to a flash photography position which is focussed at a smaller distance than the distance corresponding to the normally focussed position.

In accordance with the invention, when the lens protective cover is brought to its open position in order to take a picture, the taking lens is already adjusted to its normally focussed position, so that a picture can be taken of almost any object being photographed with a proper focussing, without requiring any distance adjustment. In addition, when an operating member which enables a flash photography is operated, the taking lens is adjusted to a flash photography position, so that a flash photography of almost any object being photographed which is located within the extent of projection of the flashlight can be made with a proper focussing, again without any distance adjustment.

DESCRIPTION OF PREFERRED EMBODIMENT

Figure 1:
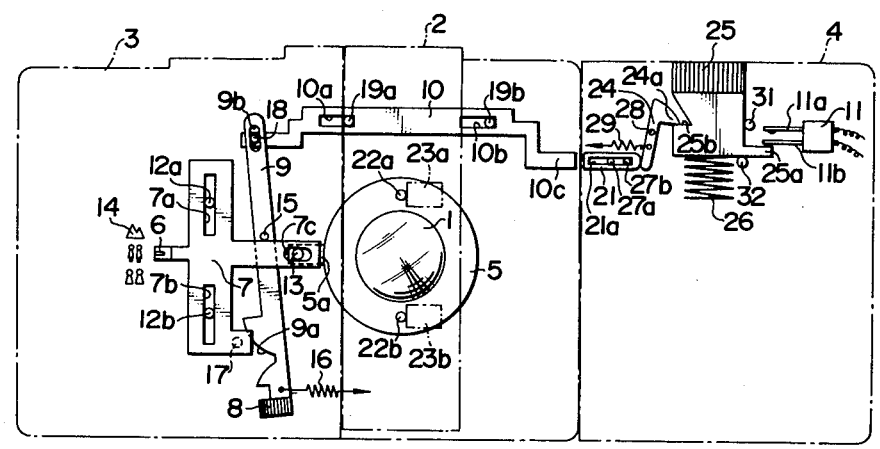
FIG. 1 is a schematic front view of an apparatus for presetting the photographing distance for a camera according to one embodiment of the invention.

Referring to FIG. 1, there is shown an apparatus for presetting the photographing distance for a camera which is constructed according to one embodiment of the invention. The apparatus is mounted in a camera 3 including a taking lens 1 which is covered by a lens protective cover 2 movable between a first position where it covers the taking lens 1 and a second position where it allows the taking lens to be exposed. A devoted electronic flash 4 is adapted to be detachably mounted on the right-hand side of the camera 3, by mounting means, not shown.

The apparatus essentially comprises a lens barrel 5 which supports the taking lens 1, distance presetting member 7 connected to the lens barrel 5 and having a distance adjusting knob 6 integrally formed therewith, a flash photography operating member 9 having a knob 8 integrally formed therewith which enables a flash photography, and a connection member 10 mechanically interlocked with the operating member 9 for closing a power switch 11 of the electronic flash 4.

The distance presetting member 7 is formed by a t-shaped plate with the knob 6 formed on the top end of the letter "t" or on the free end of its left-hand projection. The both horizontal limbs of the letter "t", or the upper and lower limbs as viewed in FIG. 1, are formed with lengthwise elongate guide slots 7a, 7b, which are engaged by stationary guide pins 12a, 12b, thus allowing a sliding movement of these limbs in the vertical direction, as viewed in FIG. 1. The vertical limb of the letter "t", or the right-hand horizontal limb as viewed in FIG. 1, is formed with horizontally extending drive slot 7c toward its free end, which is engaged by a driven pin 13 fixedly mounted on a driven piece 5a projecting from the outer periphery of the lens barrel 5. The lower vertical limb of the distance presetting member 7 has an extension extending to the right, as viewed in FIG. 1, on the rear side of which is fixedly mounted a follower pin 17 for engagement with a cam 9a which is utilized for establishing a distance for a flash photography.

Three zone focus indices 14 formed by a chevron shape, a whole figure and a half figure are depicted on the front surface of the camera 3, and the knob 6 can be brought into alignment with one of these indices. When the knob 6 is aligned with the chevron index, the distance presetting member 7 moves to its uppermost position, whereby the cooperation between the slot 7c and the pin 13 causes the lens barrel 5 to rotate to its clockwise limit, causing the taking lens 1 to be retracted into the camera until the camera is focussed to infinity. When the knob 6 is aligned with the whole figure index, the distance presetting member 7 moves to its intermediate position where the lens barrel 5 assumes an intermediate angular position, causing the taking lens 1 to be focussed to an intermediate distance of 3 m, for example. Finally, when the knob 6 is aligned with the half figure index, the distance presetting member 7 moves to its lowermost position to cause the lens barrel 5 to rotate to its counter-clockwise limit causing the taking lens 1 to be extended forward so as to be focussed to a minimum distance of 1 m, for example.

The flash photography operating member 9 is formed by an elongate lever which is pivotally mounted on a pin 15 which is in turn fixedly mounted on a stationary member, not shown, and fixedly carries the knob 8 on its lower end. Toward its lower end, the operating member 9 is engaged by one end of a coiled tension spring 16, whereby the member 9 is urged to rotate counter-clockwise about the pin 15. However, when the knob 8 is not operated as shown in FIG. 1, the resulting angular movement of the operating member 9 is limited by the abutment of the right-hand end faces of elongate guide slots 10a, 10b, to be described later, formed in the connection member 10, against stationary guide pins 19a, 19b which are fitted into these slots. Toward the lower end and along the left-hand lateral edge, the operating member 9 is formed with the cam 9a which is adapted to be engaged by the follower pin 17 to establish a distance to be used in the flash photography. The cam 9a has a cam profile which is defined by a pair of arcuate surfaces of a V-shaped notch. As measured across its opening, the notch has a width which is chosen to be sufficient to cover the extent of movement of the follower pin 17. Consequently, when the operating member 9 is turned to a position shown in FIG. 2 which represents the operated position of the knob 8, the engagement between the cam 9a and follower pin 17 causes the distance presetting member 7 to be moved to a position where the knob 6 is located intermediate the whole figure and half figure index 14. At this time, the engagement between the slot 7c and the pin 13 causes the lens barrel 5 to be rotated to a given position where the taking lens 1 is focussed to a point located on the nearer side or to a flash photography position.

An elongate transmission slot 9b is formed in the upper end of the operating member 9 for transmitting a movement of the knob 8 to the electronic flash 4. The slot 9b is engaged by a pin 18 fixedly mounted on the left-hand end of the connection member 10. The connection member 10 is in the form of a horizontally elongate crank member, and is formed with horizontally elongate guide slots 10a, 10b which are engaged by stationary guide pins 19a, 19b, whereby the connection member 10 is slidable in the horizontal direction. As shown, the opposite ends of the connection member 10 are stepped to be located below the intermediate portion. The pin 18 is fixedly mounted on the left-hand end while the right-hand end forms a drive element 10c which is located through an opening, not shown, formed in the right-hand sidewall of the camera 3, to be opposite to a driven member 21 on the part of the electronic flash 4.

It is to be noted that the camera 3 is provided with means which establishes a normally focussed position for the taking lens 1 automatically in response to the closure of the lens protective cover 2. Specifically, a pair of pins 22a, 22b are fixedly mounted on the front surface of the lens barrel 5 substantially in vertical alignment, and are adapted to be engaged by push members 23a, 23b which are provided on the rear side of the lens protective cover 2. Accordingly, when the lens protective cover 2 is closed, the push members 23a, 23b bear against the pins 22a, 22b to force the lens barrel 5 to be returned to its intermediate angular position where the taking lens 1 is automatically adjusted to the normally focussed position. The normally focussed position corresponds to a position assumed by the knob 6 when it is aligned with the whole figure index 14.

The electronic flash 4 includes a connection mechanism which causes the power switch 11 thereof to be closed in response to an operation of the knob 8 disposed on the camera 3. The connection mechanism essentially comprises the driven member 21 disposed in opposing relationship with the drive element 10c formed on the end of the connection member 10, a detent lever 24 disposed to be operated by the driven member 21 for rocking motion, an indicator 25 which is locked in its retracted position by the detent lever 24 and is also operable to indicate the completion of a charging operation within the electronic flash, a coiled compression spring 26 for urging the indicator 25 toward a position in which the indicator member 25 projects about the top level of the electronic flash 4, and an actuator 25a disposed below the indicator member and having an extension which protects to the right to be located below a pair of conductive contacts 11a, 11b of the power switch 11.

The driven member 21 is in the form of a horizontally elongate plate which is centrally formed with a horizontally elongate guide slot 21a in which a pair of stationary guide pins 27a, 27b are fitted, thereby allowing a sliding motion of the driven member 21. The left-hand end face of the driven member 21 is located opposite to the drive element 10c through an opening formed in the left-hand sidewall of the electronic flash 4, so that when the knob 8 is operated to cause the drive element 10c to extend into the electronic flash 4 through the openings formed in the opposite walls of the camera 3 and the electronic flash 4, the driven member is driven by the element 10c to slide to the right.

Figure 2:
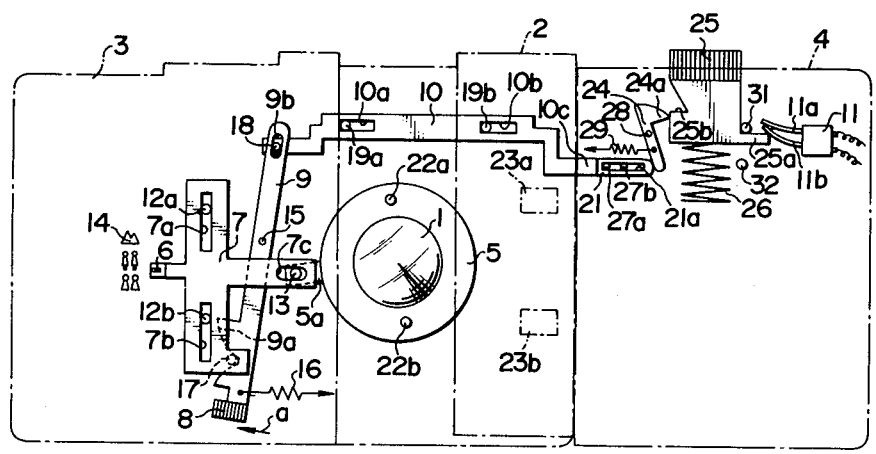
FIG. 2 is a schematic front view illustrating the operative position of the apparatus shown in FIG. 1.

The detent lever 24 is formed by an elongate lever having a pawl 24a on its top end, and is pivotally mounted on a pin 28 which is fixedly mounted on a stationary member, not shown. Toward its lower end, the detent lever 24 is engaged by one end of a coiled tension spring 29, whereby it is urged to rotate clockwise about the pin 28. However, when the knob 8 is not operated as shown in FIG. 1, the resulting rotation of the detent lever 24 is limited by the abutment of the left-hand side of the lower end of the lever 24 against the right-hand side of the driven member 21, the right-hand end face of the guide slot 21a of which in turn bears against the stationary pin 27b. When the knob 8 is not operated as shown in FIG. 1, the detent lever 24 assumes an angular position in which the pawl 24a is engaged with a notch 25b formed in the left-hand wall of the indicator member 25, thus locking the indicator member 25 in its retracted position. When the knob 8 is operated as shown in FIG. 2, the detent lever 24 rotates counter-clockwise to a position where the pawl 24a is disengaged from the notch 25b, thus freeing the indicator member 25.

The indicator member 25 internally houses a lamp, not shown, which is illuminated whenever a main capacitor, not shown, contained within the electronic flash 4 is charged to a given voltage. The indicator member 25 is slidable between a retracted position where the upper surface of the member 25 is flush with the top surface of the electronic flash 4 and an indication position where the upper portion of the member 25 slightly projects above the top surface of the electronic flash 4. The indicator member 25 is normally urged upward by the coiled spring 26 which abuts against the bottom surface thereof. However, when the knob 8 is not operated as shown in FIG. 1, the resulting movement of the member 25 is blocked by the engagement of the pawl 24a with the notch 25b. When the knob 8 is operated as shown in FIG. 2, the indicator member is permitted to move upward, but stops at the indication position as a result of the abutment of the actuator 25a against a stop pin 31 which is fixedly mounted on a stationary member, not shown. Another stop pin 32 is shown for preventing a movement of the indicator member 25 into the electronic flash 4 beyond the retracted position.

In the retracted position of the indicator member 25 shown in FIG. 1, the actuator 25a is removed from the contacts 11a, 11b of the power switch, which therefore remains open. In the indication position of the member 25 shown in FIG. 2, the actuator 25a pushes up the free end of the contacts 11a, 11b, which therefore move into contact with each other, thus closing the switch 11.

In operation, when a flash photography is desired by mounting the devoted electronic flash 4 on the camera 3, the lens protective cover 2 is initially moved to the right from its closed position shown in FIG. 1, thus allowing the taking lens 1 to be exposed through the front of the camera 3. Before the cover 2 is opened, the push members 23a, 23b bear against the pins 22a, 22b, respectively, so that the lens barrel 5 assumes an intermediate angular position and the taking lens 1 is located at the normally focussed position. Accordingly, the knob 6 on the distance presetting member 7 is aligned with the whole figure index 14.

Subsequently, the knob 8 is moved to the left, as indicated by an arrow a in FIG. 2, to enable a flash photography. The operating member 9 then moves clockwise about the pin 15 against the resilience of the coiled spring 16, whereby the cam 9a engages the follower pin 17 to move the distance presetting member 7 in a manner such that the knob 6 is moved to the flash photography position which is defined intermediate the whole figure and the half figure index 14. As a result of such movement of the distance presetting member 7, the lens barrel 5 moves angularly to bring the taking lens 1 to the flash photography position which is located on the nearer side than the normally focussed position.

On the other hand, as the operating member 9 moves angularly, the engagement between the slot 9a and the pin 18 causes the connection member 10 to move to the right. As a result, the drive element 10c formed on the right-hand end of the connection member 10 moves into the electronic flash 4, driving the driven member 21 to the right, thus causing the detent lever 24 to be turned counter-clockwise about the pin 28 against the resilience of the spring 29. The resulting angular movement of the detent lever 24 permits the pawl 24a to be disengaged from the notch 25b, whereupon the indicator member 25 is permitted to move upward under the resilience of the spring 26 until the actuator 25a abuts against the stop pin 31, whereupon the indicator member comes to a stop at the indication position. At this time, the actuator 25a drives the lower contact 11b into contact against the upper contact 11a, thus closing the switch 11. As a result, the main capacitor within the electronic flash begins to be charged.

Subsequently when the knob 8 is released, the resilience of the spring 16 allows the knob 8, the operating member 9 and the connection member 10 to be returned to their respective original positions. As the connection member 10 returns, the resilience of the spring 29 tends to return the driven member 21 and the detent lever 24 to their original positions, but the pawl 24a bears against the left-hand side of the indicator member 25 at a point below the notch 25b, thus preventing a further angular movement of the lever 24.

When the main capacitor is charged to the given voltage, the lamp within the indicator member 25 is illuminated to indicate the completion of a charging operation. Thereupon, a shutter release button, not shown, may be depressed, whereupon flashlight is emitted from the electronic flash. Since the taking lens 1 is already focussed properly to an object being photographed which is located within the extent of projection of the flashlight, there can be obtained a photograph which is properly focussed.

When it is desired to terminate the operation of the electronic flash 4 after a picture has been taken, the indicator member 25 may be depressed manually from above, thus forcing it into the electronic flash 4. Thereupon, the member 25 moves down against the resilience of the spring 26 until the pawl 24a is engaged with the notch 25b under the resilience of the spring 29, thus locking the member 25 in its retracted position. At the same time, the actuator 25a is removed from the contacts 11a, 11b, thus opening the power switch 11. Hence, the main capacitor ceases to be charged, and the electronic flash 4 resumes its inoperative condition.

Subsequently, the lens protective cover 2 may be brought to its closed position, whereupon the push members 23a, 23b move into abutment against the pins 22a, 22b, to cause a rotation of the lens barrel 5 until the taking lens 1 is automatically adjusted to the normally focussed position. At this time, the distance presetting member 7 is also driven so that the knob 6 is aligned with the whole figure index 14 representing an intermediate position.

In the above embodiment, it has been assumed that a devoted electronic flash is mounted on the camera in use, but it should be understood that the invention is equally applicable to a camera internally housing an electronic flash.

What is claimed is:

1. An apparatus for presetting the photographing distance for a camera which includes means for adjusting the photographing distance by causing a movement of a taking lens in the direction of an optical axis and means for establishing a normally focussed position of the taking lens in response to the closure of a lens protective cover which opens or closes the front surface of the taking lens; the apparatus comprising:

switch operating means disposed on an electronic flash which is internally housed within or which is detachably mounted on the camera for turning on or off a power switch of the electronic flash;

flash photography operating means for operating the switch operating means in a direction to turn the power switch on;

interlock means responsive to a movement of the flash photography operating means to operate said means for adjusting the photographing distance to bring the taking lens to a flash photography position which is located on the nearer side than the normally focussed position; and said switch operating means including an indicator member having a lamp for indicating the completion of a charging operation within said electronic flash; said indicator member being movable between a position in which it projects outwardly of said electronic flash and in which said power switch is turned on, and another position retracted within said electronic flash and in which said power switch is turned off.

2. An apparatus for adjusting photographing distance according to claim 1 in which the indicator member is associated with resilient means for biasing the member of the position projecting externally of the electronic flash, and is also associated with a detent member for maintaining the indicator member in the retracted position within the electronic flash against the resilience of the resilient means, the detent member being actuated in response to the operation of the flash photography operating means to free the indicator member.

3. An apparatus for presetting the photographing distance for a camera which includes means for adjusting the photographing distance by causing a movement of a taking lens in the direction of an optical axis and means for establishing a normally focussed position of the taking lens in response to the closure of a lens protective cover which opens or closes the front surface of the taking lens; the apparatus comprising:

switch operating means disposed on an electronic flash which is internally housed within or which is detachably mounted on the camera for turning on or off a power switch of the electronic flash;

flash photography operating means for operating the switch operating means in a direction to turn the power switch on;

interlock means responsive to a movement of the flash photography operating means to operate said means for adjusting the photographing distance to bring the taking lens to a flash photography position which is located on the nearer side than the normally focussed position; and said interlock means comprising a V-shaped cam formed on said flash photography operating means, and a follower pin mounted on said means for adjusting photographing distance, and wherein as said flash photography operating means is operated, said cam engages said follower pin to drive it so that said means for adjusting photographing distance is driven to bring the taking lens to the flash photography position.

4. Apparatus for presetting the flash photographing distance for the lens of a camera in combination with an electronic flash, said electronic flash having a power switch, comprising:

distance presetting means for engaging and moving said lens to a predetermined setting for a flash photography distance;

operating means for actuating said distance presetting means and for actuating switch operating means;

said switch operating means being movable to engage and actuate said power switch to commence charging of said electronic flash;

said distance presetting means including first means for rotating said lens to said predetermined flash setting and including second means for engagement by said operating means to actuate said distance presetting means; and said operating means including an operating member having engagement means for engaging and moving said second means of said distance persetting means and a connection member connected to and operated by said operating member, said connection member being operable for engaging and actuating said switch operating means.

5. Apparatus in accordance with claim 4, wherein said switch operating means includes an indicator member for indicating the completion of a charging operation within said electronic flash.

6. Apparatus for presetting the flash photographing distance for the lens of a camera in combination with an electronic flash, said electronic flash having a power switch, comprising:

distance presetting means for engaging and moving said lens to a predetermined setting for a flash photography distance;

operating means for actuating said distance presetting means and for actuating switch operating means;

said switch operating means being movable to engage and actuate said power switch to commence charging of said electronic flash, and including an indicator member for indicating the completion of a charging operation within said electronic flash; and said indicator member being movable between a first position in which it projects outwardly from said electronic flash and in which said power switch is turned on, and a second position wherein said indicator member is retracted within said electronic flash and in which said power switch is turned off.

7. Apparatus in accordance with claim 6, wherein said switch operating means further includes means for holding said indicator member in said retracted position within said electronic flash, said holding means being actuated by said connection member to release said indicator member.

* * * * *

UNITED STATES PATENT AND TRADEMARK OFFICE
CERTIFICATE OF CORRECTION

PATENT NO. : 4,395,101
DATED      : July 26, 1983
INVENTOR(S) : Ichiro Morimoto

It is certified that error appears in the above—identified patent and that said Letters Patent is hereby corrected as shown below:

Column 6, line 2, delete "9a" and substitute therefor --9b--.

Column 7, Claim 2, line 4, delete "of" (first occurrence) and substitute --to--.

Column 8, Claim 4, line 26, delete "persetting" and insert --presetting--.

Signed and Sealed this

Eleventh Day of October 1983

[SEAL]

Attest:

GERALD J. MOSSINGHOFF

Attesting Officer

Commissioner of Patents and Trademarks